US006050795A

United States Patent [19]

Bodzak et al.

[11] Patent Number: 6,050,795

[45] Date of Patent: Apr. 18, 2000

[54] FUEL FEED GEAR PUMP HAVING AN OVERLOAD SAFETY DEVICE

[75] Inventors: Stanislaw Bodzak, Elsbethen; Hanspeter Mayer, Hallein; Theodor Stipek, Salzburg, all of Austria

[73] Assignee: Robert Bosch GmbH, Stuttgart, Germany

[21] Appl. No.: 08/881,283

[22] Filed: Jun. 24, 1997

[30] Foreign Application Priority Data

Jun. 26, 1996 [DE] Germany .......................... 196 25 488

[51] Int. Cl.[7] .............................. F04C 2/18; F04C 15/04; F16D 7/02

[52] U.S. Cl. ............................ 418/69; 418/206.1; 464/30

[58] Field of Search .................................. 418/69, 206.1; 464/30, 34, 89

[56] References Cited

U.S. PATENT DOCUMENTS

| | | | |
|---|---|---|---|
| 2,629,326 | 2/1953 | White | 418/69 |
| 2,848,884 | 8/1958 | Maude | 464/30 |
| 3,080,735 | 3/1963 | Blom, Jr. et al. | 464/30 |
| 3,146,612 | 9/1964 | Lorenz | 464/30 |
| 4,242,782 | 1/1981 | Hanneken et al. | 464/30 |

FOREIGN PATENT DOCUMENTS

| | | |
|---|---|---|
| 20911 | 5/1960 | Austria . |
| 844229 | 7/1952 | Germany . |

*Primary Examiner*—John J. Vrablik
*Attorney, Agent, or Firm*—Ronald E. Greigg; Edwin E. Greigg

[57] ABSTRACT

The invention relates to a fuel feed pump for a fuel injection pump for internal combustion engines, having a pair of gear wheels that mesh with one another and are driven to rotate in a pump chamber. The pair of gear wheels pump fuel out of an intake chamber that communicates with a supply tank along a feed conduit, formed between the end face of the gear wheels and the circumferential wall of the pump chamber, into a pressure chamber that communicates with the fuel injection pump. One gear wheel is secured to a shaft is driven to rotate by means of a drive element that engages the shaft, wherein the drive element can be connected to the shaft by an overload safety device.

12 Claims, 2 Drawing Sheets

FUEL FEED GEAR PUMP HAVING AN OVERLOAD SAFETY DEVICE

BACKGROUND OF THE INVENTION

The invention is based on a fuel feed pump for a fuel injection pump for internal combustion engines.

In such fuel injection pumps, a rotationally driven pair of gear wheels meshing with one another is provided in a pump chamber; this pair of wheels pump fuel out of an intake chamber, communicating with a supply tank, into a pressure chamber communicating with the fuel injection pump, along a feed conduit formed between the end face of the gear wheels and the circumferential wall of the pump chamber. A gear wheel is secured to a shaft and can be driven to rotate with a drive element engaging the shaft. The drive element is provided outside the pump chamber housing and transmits a rotary motion via a spur gear or Oldham coupling to a second gear wheel that meshes with the first gear wheel and is disposed on an axle supported on a housing.

Such drive elements are connected to the drive shaft in a manner fixed against relative rotation. In such gear-wheel pumps, immediately after starting, at a relatively low rpm dictated by the low rpm of the starter motor, a high supply flow is necessary so that lines and the suction chamber of the fuel injection pump will be filled quickly and put under pressure.

The known fuel feed pump has the disadvantage, however, that once an engine has been put into operation the quantity of fuel supplied by the fuel feed pump is substantially higher than the fuel quantity required for combustion. Also, if the gear wheels seize or block, damage can occur to the connection between the drive element and the driven shaft of the first gear wheel.

OBJECT AND SUMMARY OF THE INVENTION

The fuel feed pump for a fuel injection pump for internal combustion engines has the advantage over the prior art that by interposing an overload safety device between the drive element and a shaft that drives a first gear wheel, an excessive increase in the pressure in the pressure chamber can be avoided. Moreover, by means of the overload safety device, an excessive increase in a reaction moment of the maximum transmissible torque can be avoided. As a result, if the gear wheels should seize or block, the overload safety device can enable decoupling between the drive element and the shaft, thus averting an overload on the shaft in the housing. Moreover, this overload safety device has the advantage that there can be compensation in the event of axial offset between the axis of the shaft and the axis of the drive element. Furthermore, such an overload safety device can compensate for an axial spacing between the shaft and the drive element. By this kind of simple connection between the drive element and the shaft, it can be possible to avoid fretting rust. In addition, it is possible to improve the dry-running capability compared with an Oldham coupling or the like known from the prior art. Also, no angular positional orientation of the kind is needed in an Oldham coupling, for instance, if necessary when the coupling member is connected.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
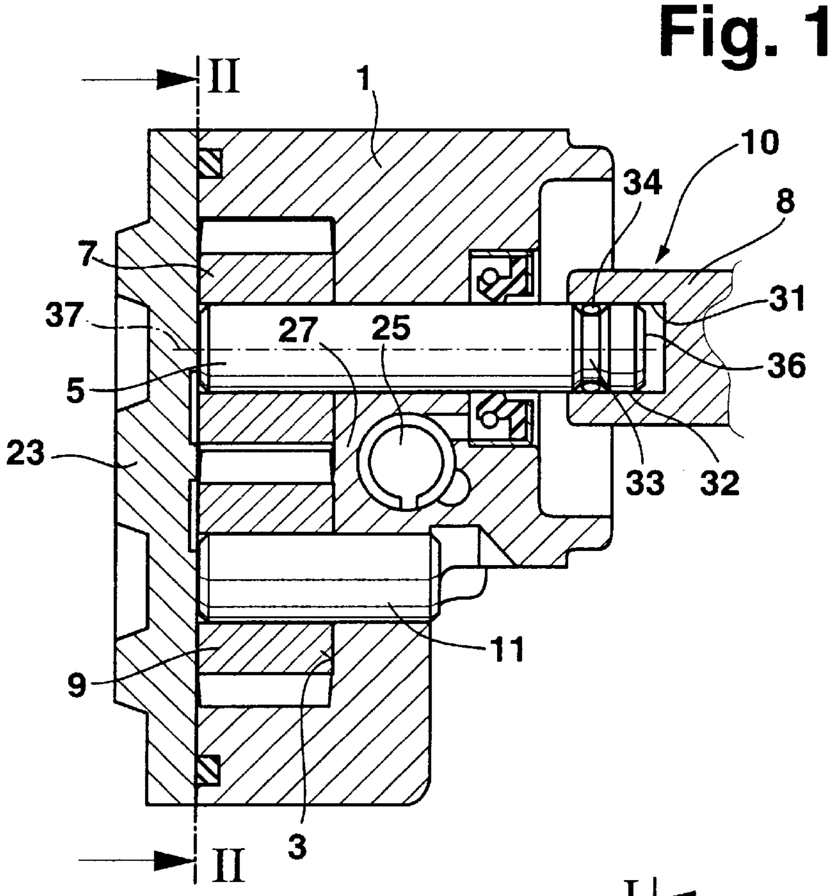
FIG. 1 is a longitudinal section through the fuel feed pump taken along the line I—I of FIG. 2.
Figure 2:
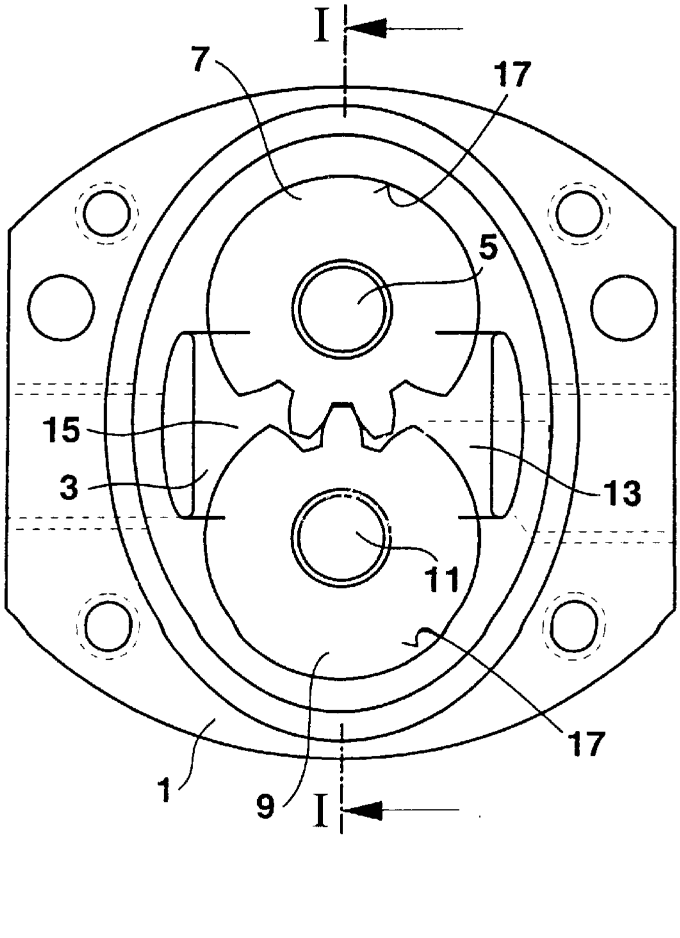
FIG. 2 is a plan view on the fuel feed pump shown in FIG. 1, with the housing cap removed.

FIGS. 1 and 2 show various views of a fuel feed pump that is used in an inflow line, not shown, from a supply tank to a fuel injection pump for internal combustion engines. The feed pump in its housing 1 has a pump chamber 3, in which a rotationally driven pair of gear wheels that mesh with one another is disposed. A first gear wheel 7 secured to a shaft 5 is driven to rotate by means of a drive element 8, via an overload safety device 10 described in further detail hereinafter, and transmits this rotary motion by means of a spur gear 7 to a second gear wheel 9, which meshes with the first gear heel 7 and is disposed on an axle 11 supported on the housing. The gear wheels 7, 9, by the engagement of their teeth which are only partially shown, divide the pump chamber 3 into two parts, of which a first part forms an intake chamber 13 and a second part forms a pressure chamber 15. The intake chamber 13 communicates with the pressure chamber 15 via one feed conduit 17 each formed between the grooves between teeth on the end faces of the first gear wheel 7 and the second gear wheel 9 and the circumferential wall of the pump chamber 3. In addition, the intake chamber 13 and the pressure chamber 15 each have one connection opening in the wall of the pump housing 1, by way of which the intake chamber 13 communicates with an intake line, not shown in further detail, from the supply tank and the pressure chamber 15 communicates with a feed line, likewise not shown, to the suction chamber of the fuel injection pump.

The pump chamber 3 is closed, on its one end-face axial orientation of the shaft 5 and axle 11, by a housing cap 23, which has been removed in the view of FIG. 2 and thus allows one to see into the interior of the pump.

For controlling the feed pressure in the pressure chamber 15, a bypass conduit 25 is also provided in the pump housing 1. This bypass conduit 25 is formed by a bore in a housing segment 27 that defines the pump chamber 3 on its face end remote from the housing cap 23 and disconnects the pressure from the suction side and thus forms one wall of the pump chamber. The bore forming the bypass conduit 25 is embodied as a through bore, whose one end discharges into the pressure chamber 15 and whose other end discharges into the intake chamber 13. A pressure valve not shown in further detail is inserted into the bypass conduit 25. If there is excessive elevation of pressure in the pressure chamber 15, the pressure valve is opened and forms a short circuit for the flow to the intake chamber 13. The opening pressure of the pressure valves can be adjustable.

Figure 3:
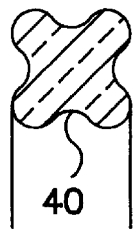
FIG. 3 illustrates a cross sectional view of a somewhat square ring.
Figure 4A:
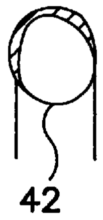
FIGS. 4*a*–4*e* illustrate portions of sheet metal sleeves.
Figure 4B:
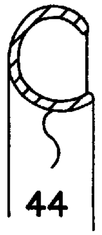
Figure 4C:
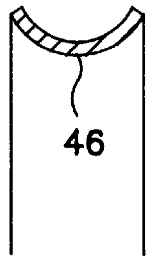
Figure 4D:
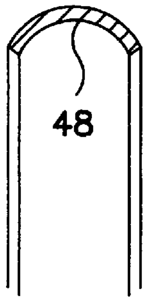
Figure 4E:
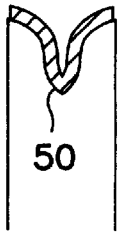
Figure 5:
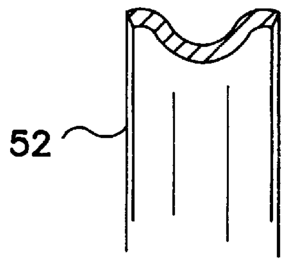
FIG. 5 illustrates a portion of a corrugated sheet metal sleeve.
Figure 6:
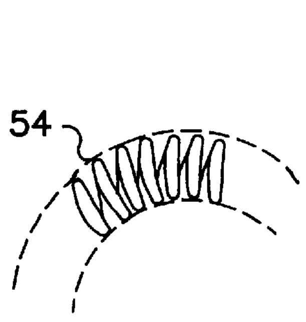
FIG. 6 illustrates a spiral spring.
Figure 7A:
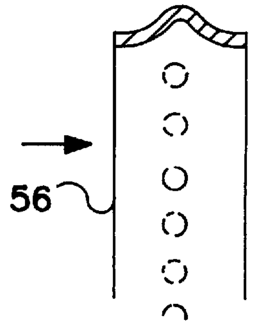
FIGS. 7*a* and 7*b* illustrate partial views of a tolerance ring.
Figure 7B:
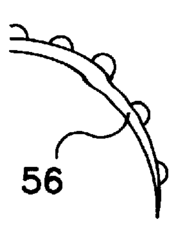

The drive element 8 is connected to the shaft 5 via the overload safety device 10. To that end, the drive element 8 has a bore 31 in which a portion 32 of the shaft 5 is disposed. A circumferential groove 33 on which a connecting element 34 is seated is made in the shaft portion 32. This connecting element is embodied as an O-ring. As an alternative, a square ring 40 as shown in a cross sectional view in FIG. 3, sheet metal rings 42–50 as partially shown in FIGS. 4*a*–4*e,* a corrugated sheet metal sleeve 52 as partially shown in FIG. 5 a spiral ring 54 as shown partially in FIG. 6, a tolerance ring 56 as partially shown in FIG. 7*a,* FIG. 7*b* is a partial view looking in a direction of the arrow shown in FIG. 7*a* or the like may be provided. The connecting element 34 is press-fitted into the bore 31 and thus forms a nonpositive connection between the bore 31 of the drive element 8 and the portion 32 of the shaft 5. The shaft portion 32 has introduction bevels 36 on its face end pointing into the bore 31. This makes for easier assembly or mounting of the drive element 8 on the shaft portion 32.

The overload safety device 10 makes it possible to compensate for axial offsets between the longitudinal axis 37 of the shaft 5 and the longitudinal axis 38 of the drive element 8 and allows the two parts to be joined together in an arbitrary angular position. An axial spacing between the drive element 8 and the shaft portion 32 disposed in the bore 31 can also be compensated for. To that end, the bore 31, which is embodied as a blind bore, has a depth that is greater than the length of the shaft portion 32 to be received.

If the gear wheels 7, 9 seize or block, then the reaction moment exceeds the maximum transmissible torque, and the connecting element 34 slides through on the shaft 5, or the bore 31 of the drive element 8 slides through on the connecting element 34. The drive element 8 suffers no resultant overload. As a result, the drive mechanism, not shown, of the drive element 8 can be protected.

Depending on the diameter of the connecting element 34, the maximum transmissible torque can be determined. Advantageously a temperature-resistant plastic, preferably a fluorine elastomer, is provided for the connecting element 34.

By means of this simple connection, the advantage can be attained that fretting rust can be avoided. Moreover, thus overload safety device 10 has a dry-running capability, so that an overload safety device 10 that is adaptable to the particular application and that can have a long service life is provided.

As an alternative to the above-described exemplary embodiment, it may be provided that instead of the connecting element 34 in the form of an O-ring, a sheet-metal sleeve can be provided on the shaft portion 32. As a result, higher torques can be transmitted. This sheet-metal sleeve can advantageously be embodied as a corrugated sheet-metal sleeve, so that once again as a function of the contacting areas between the sheet-metal sleeve and the bore 31 and between the sheet-metal sleeve and the shaft portion 32, a defined maximum transmissible torque can be provided.

As an alternative, it is equally possible to provide that the drive element 8 engages a bore of the shaft 5, so that this device 10 according to the invention can be disposed analogously inside the bore of the shaft 5. It can also be provided as an alternative that two or more overload safety devices 10 are connected in series with one another. As a result, there can advantageously be a greater compensation for the possibly not coaxially extending longitudinal axis 37 of the shaft 5 and longitudinal axis 37 of the drive element 8.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel feed pump for a fuel injection pump for internal combustion engines, comprising a pump chamber, a pair of gear wheels (7, 9) that mesh with one another, means for driving the gear wheels to rotate in said pump chamber (3), said gear wheels pump fuel out of an intake chamber (13) that communicates with a supply tank along a feed conduit (17), said feed conduit is formed between an end face of the gear wheels (7, 9) and a circumferential wall of the pump chamber, and feeds fuel into a pressure chamber (15) that communicates with the fuel injection pump, said gear wheel (7) is secured to and driven by a shaft (5), said shaft is driven to rotate by a driven element (8) that engages the shaft (5), and the drive element (8) is connected to the shaft (5) by an overload safety device (10), said overload safety device (10) includes a shaft portion (32) of the shaft (5), said shaft portion (32) is disposed in a bore (31) of the drive element (8) and the shaft portion (32) is connected nonpositively to the bore (31), and includes an elastic connecting element (34) on the shaft portion (32) that is press-fitted into the bore (31) of the drive element (8)and at least a slight axial offset between a longitudinal axis (37) of the shaft (5) and a longitudinal axis (38) of the drive element (8) is compensated for by the overload safety device (10).

2. A fuel feed pump as set forth in claim 1, in which the shaft portion (32) has a circumferential groove (38) that receives the elastic connecting element (34).

3. A fuel feed pump as set forth in claim 1, in which the elastic connecting element (34) is embodied as a sheet-metal sleeve.

4. A fuel feed pump as set forth in claim 1, in which the elastic connecting element (34) is embodied as a corrugated sheet metal sleeve.

5. A fuel feed pump as set forth in claim 1, in which the elastic connecting element (34) is embodied as a spiral ring.

6. A fuel feed pump as set forth in claim 1, in which the elastic connecting element (34) is embodied as a tolerance ring.

7. A fuel feed pump as set forth in claim 1, in which an axial spacing between the portion (32) of the shaft (5) and the bore (31) of the drive element (8) is compensated for.

8. A fuel feed pump as set forth in claim 1, in which the shaft (5) is axially joined to the drive element (8) in an arbitrary angular position.

9. A fuel feed pump as set forth in claim 1, in which the elastic connecting element (34) is embodied as an O-ring.

10. A fuel feed pump as set forth in claim 9, in which the shaft portion (32) has a circumferential groove (38) that receives the elastic connecting element (34).

11. A fuel feed pump as set forth in claim 1, in which the elastic connecting element (34) is embodied as a square ring.

12. A fuel feed pump as set forth in claim 11, in which the shaft portion (32) has a circumferential groove (38) that receives the elastic connecting element (34).

* * * * *